United States Patent
Neishaboori et al.

(10) Patent No.: US 12,352,599 B2
(45) Date of Patent: Jul. 8, 2025

(54) V2X MESSAGE-BASED TRACKER APPLICATION

(71) Applicant: FORD GLOBAL TECHNOLOGIES, LLC, Dearborn, MI (US)

(72) Inventors: Azin Neishaboori, Plymouth, MI (US); Syed Amaar Ahmad, Canton, MI (US); Esrafil Jedari, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/347,307

(22) Filed: Jun. 14, 2021

(65) Prior Publication Data

US 2022/0397415 A1 Dec. 15, 2022

(51) Int. Cl.
| | |
|---|---|
| G01C 21/36 | (2006.01) |
| G01C 21/00 | (2006.01) |
| H04W 4/44 | (2018.01) |
| H04W 4/46 | (2018.01) |

(52) U.S. Cl.
CPC ..... *G01C 21/3697* (2013.01); *G01C 21/3632* (2013.01); *G01C 21/3664* (2013.01); *G01C 21/3893* (2020.08); *H04W 4/44* (2018.02); *H04W 4/46* (2018.02)

(58) Field of Classification Search
None
See application file for complete search history.

(56) References Cited

U.S. PATENT DOCUMENTS

| | | | |
|---|---|---|---|
| 9,031,776 B2 | 5/2015 | Goudy et al. | |
| 9,669,828 B2 | 6/2017 | Caveney et al. | |
| 10,235,882 B1 | 3/2019 | Aoude et al. | |
| 2017/0110012 A1 | 4/2017 | Lewis et al. | |
| 2018/0342065 A1* | 11/2018 | Hovis | G06V 10/426 |
| 2019/0043357 A1* | 2/2019 | Stinnett | G08G 1/096791 |
| 2022/0055657 A1* | 2/2022 | McIntosh | B60W 60/0025 |

FOREIGN PATENT DOCUMENTS

CN 111918804 A 9/2020

OTHER PUBLICATIONS

Svenson et al., Development of a Basic Safety Message for Tractor-Trailers for Vehicle-to-Vehicle Communications, Paper No. 15-0379.

* cited by examiner

*Primary Examiner* — Hongye Liang
(74) *Attorney, Agent, or Firm* — Joseph Zane; Brooks Kushman P.C.

(57) ABSTRACT

Vehicle-to-everything (V2X) message-based vehicle tracking is provided. Connected messages including position, dimension, and heading of remote vehicles are received from the remote vehicles and collected by a host vehicle. A route of the host vehicle is used to filter the remote vehicles to those within an interest neighborhood of the host vehicle. A map is displayed, to an HMI screen of the host vehicle, including the route of the host vehicle and an overlay of the remote vehicles as filtered.

25 Claims, 9 Drawing Sheets

V2X MESSAGE-BASED TRACKER APPLICATION

TECHNICAL FIELD

Aspects of the disclosure generally relate to a vehicle-to-everything (V2X) message-based vehicle tracker application.

BACKGROUND

V2X allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure. In a vehicle telematics system, a telematics control unit (TCU) may be used for various remote control services, such as over the air (OTA) software download, eCall, and turn-by-turn navigation.

SUMMARY

In one or more illustrative embodiments, a host vehicle for V2X message-based vehicle tracking is provided. The host vehicle includes a human-machine interface (HMI) screen. The host vehicle also includes a controller programmed to collect connected messages received from V2X-enabled devices, the connected messages including position, dimension, and/or heading of aspects of interest to the host vehicle, use a route of the host vehicle to filter the V2X-enabled devices to those within an interest neighborhood of the host vehicle, and display, to the HMI screen, a map including the route of the host vehicle and an overlay of the V2X-enabled devices as filtered.

In one or more illustrative embodiments, a method for vehicle-to-everything (V2X) message-based vehicle tracking is provided. Connected messages including position, dimension, and heading of remote vehicles are received from the remote vehicles and collected by a host vehicle. A route of the host vehicle is used to filter the remote vehicles to those within an interest neighborhood of the host vehicle. A map is displayed, to an HMI screen of the host vehicle, including the route of the host vehicle and an overlay of the remote vehicles as filtered.

In one or more illustrative embodiments, a non-transitory computer-readable medium includes instructions for vehicle-to-everything (V2X) message-based vehicle tracking, that when executed by a controller of a host vehicle, cause the host vehicle to perform operations including to collect connected messages received from remote vehicles, the connected messages including position, dimension, and heading of the remote vehicles; assign each remote vehicle to a unique identifier; predict future locations of each remote vehicle based on information in the connected messages; assign successive messages from each remote vehicle to the same respective unique identifier based on the predicted future locations; use a navigation route received from a navigation system of the host vehicle to filter the remote vehicles to those within an interest neighborhood of the host vehicle; and display, to a HMI screen of the host vehicle, a map including the route of the host vehicle and an overlay of the remote vehicles as filtered.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In V2X communication, position, dimension, and heading of a vehicle may be broadcast in connected messages. Using the connected messages, a HV may track the location, direction, and acceleration of vehicles in its communication range. However, the information acquired from the V2X system may be difficult to directly present to a vehicle occupant (e.g., a driver), as in addition to a few pieces of information that could help the driver, it also may contain many pieces of information which are irrelevant, i.e., their presentation to the driver may not lead to facilitated driving. Moreover, presenting too much information to a human driver may increase the burden on the cognitive system of the driver. Thus, many vehicle systems designed to consume V2X information, e.g., for Advanced Driver Assist Systems (ADAS) fully hide the information.

An improved vehicle user interface may be configured to filter and display information that can help facilitate a vehicle maneuver (e.g., to change lane or take a ramp). They presented information may be filtered to allow the driver to mitigate driving scenarios for the HV and/or RVs in a cognitively digestible and user-friendly manner. A combination of in-vehicle map navigation with connected message data overlaid may enhance function over presentation of raw connected messages that lack navigational detail as well as provide actual RV positions that are missing in current navigation systems.

The combination of navigation data with connected messages alone can provide a greater level of coverage as a combination. This may serve to enhance situational awareness of the driver over current applications that warn of more direct vehicle interactions. The system may automatically filter out RVs that can divert cognitive load and allow a minimal and relevant set of vehicles. Additionally, the improved vehicle user interface may allow a driver to track an RV. In conjunction with onboard navigation, this can provide real-time accurate routing to a tracked and moving vehicle. The improved vehicle user interface may also allow driver intent for near-future maneuvers to be expressed through combination of connected messages and map navigation.

Figure 1:
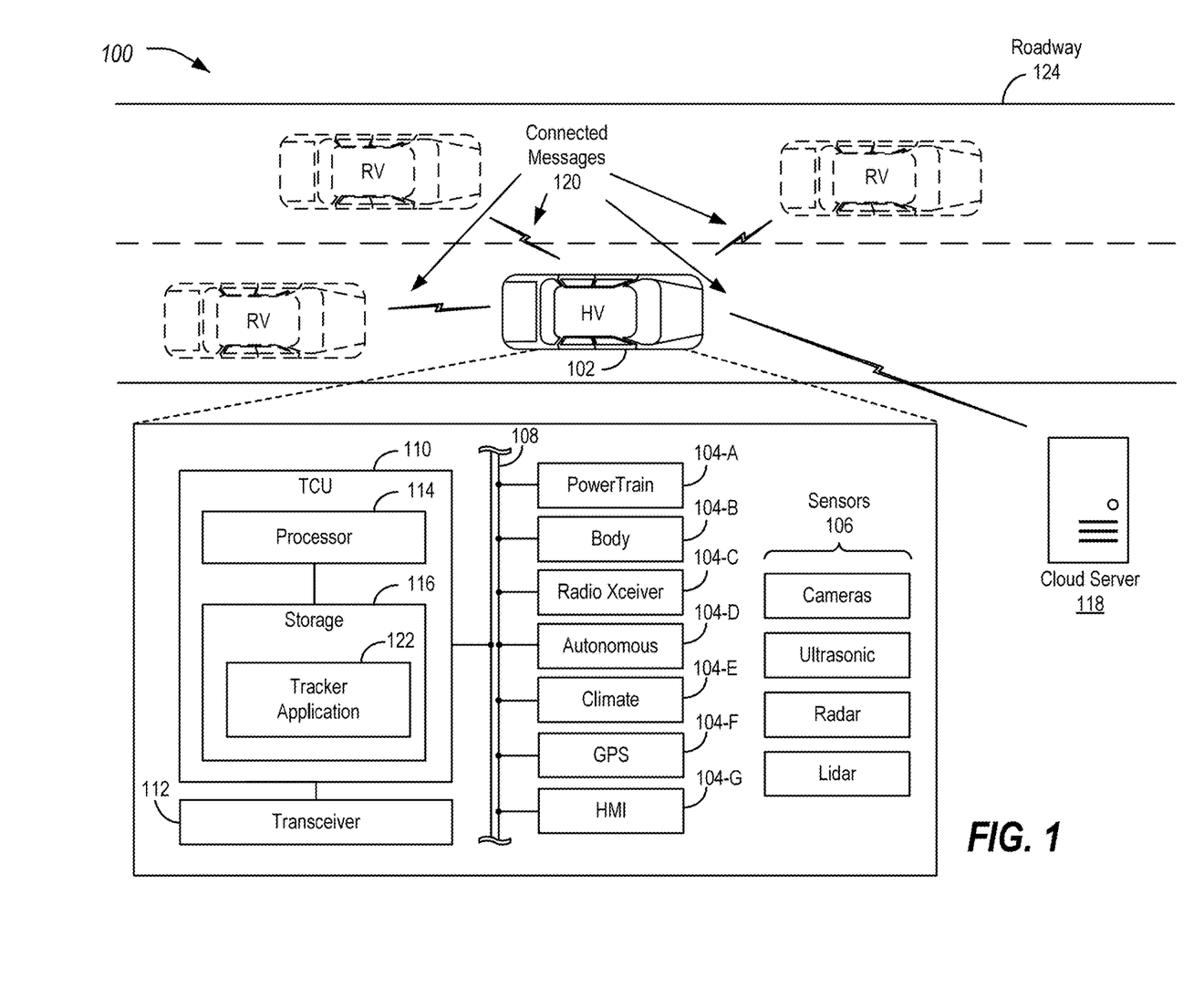
FIG. 1 illustrates an example system for performing V2X message-based vehicle tracking.

FIG. 1 illustrates an example system 100 for performing V2X message-based vehicle tracking. A vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received V2X data. The level of automation may vary between different levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104-A through 104-G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a HMI controller 104-G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., ADAS cameras), ultrasonic sensors, radar systems, and/or lidar systems.

A vehicle bus 108 may include various methods of communication available between the vehicle controllers 104, as well as between a TCU 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a cellular transceiver 112 configured to facilitate communication with other vehicles 102 or with infrastructure. The TCU 110 may, accordingly, be configured to communicate over various protocols, such as with a communication network over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc.

The TCU 110 may be configured to include one or more interfaces from which vehicle information may be sent and received. This information can be sensed, recorded, and sent to a cloud server 118. In an example, the cloud server 118 may also include one or more processors (not shown) configured to execute computer instructions, and a storage medium (not shown) on which the computer-executable instructions and/or data may be maintained.

The TCU 110 may be configured to facilitate the collection of connected vehicle data and/or other vehicle information from the vehicle controllers 104 connected to the one or more vehicle buses 108. While a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit connected messages 120 for reception by other vehicles 102. The position, dimension and heading of a vehicle 102 may be broadcast by the vehicle 102 in the in the connected messages 120. In an example, the frequency of sending the connected messages 120 may be on the order of every ten milliseconds. A V2X radio may be a relatively short-range communications unit (e.g., with a range on the order of one kilometer). In an example, the V2X radio may operate on Cellular V2X (e.g., C-V2X 3GPP). In another example, the V2X radio may operate on Institute of Electrical and Electronics Engineer (IEEE) 802.11p Dedicated Short Range Communication (DSRC). In one example, the connected messages 120 may take the form of BSM messages as described in the society of automotive engineers (SAE) standard document J2735.

The TCU 110 may be further configured to receive connected messages 120 from other vehicles 102. In an example, the management of sending and receiving of connected vehicle data may be handled by a tracker application 122 executed by the TCU 110. The connected messages 120 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, antilock brake system (ABS) system status, etc.).

While not shown, in some examples traffic participants may additionally involve communication via one or more roadside units (RSUs). The RSU may be a device with processing capabilities and networking capabilities and may be designed to be placed in proximity of a roadway 124 for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway 124 or in a specific area. The RSU may also have wired or wireless backhaul capability to allow for communication with other elements of a traffic control system, via e.g., Ethernet, or cellular connection to the cellular network infrastructure, for example over Uu interface.

Figure 2:
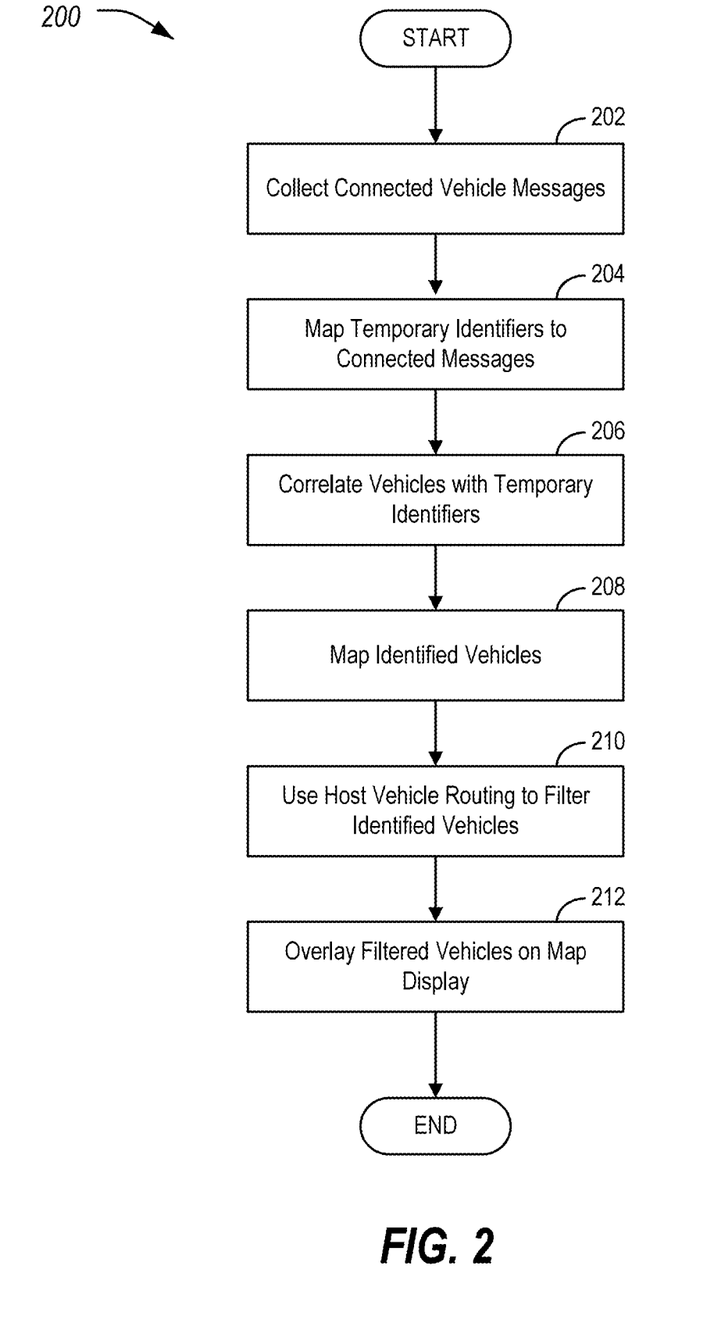
FIG. 2 illustrates an example process for the operation of a V2X message-based vehicle tracker application.

FIG. 2 illustrates an example process 200 for the operation of a V2X message-based vehicle tracker application 122. In an example the process 200 may be performed by a vehicle 102 operating as a HV in the context of the system 100.

At operation 202, the vehicle 102 collects connected messages 120. The connected messages 120 may be received to the vehicle 102 from various other vehicles acting as RVs and/or from RSUs. As noted above, the connected messages 120 may include position, dimension, and heading of the RVs.

At operation 204, the vehicle 102 maps temporary identifiers (e.g., numerical identifiers, alphanumeric identifiers, etc.) to the vehicles 102 sending the connected messages 120. In an example, the temporary identifiers may be randomly generated values. Thus, the system 100 may potentially reuse random temporary identifiers already inside the connected messages 120 to identify the vehicles 102 on the HMI or, in the alternative, generate fresh random identifiers for each of these RVs. In another example the temporary identifiers may be an incremented value. Regardless, the temporary identifiers may be designed to be unique per RV at least at one time.

At operation 206, the vehicle 102 correlates the vehicles 102 with the temporary identifiers. For instance, upon receiving a connected message 120 with a temporary identifier from which the HV has not previously received connected messages 120, the vehicles 102 uses the current location reported in the connected message 120 and compares that location with a predicted location of the previously-received connected messages 120. The predicted location may be ascertained based on at least one or more of vehicle 102 reported location, direction, acceleration, yaw rate, and an extrapolation of any possible intended trajectory included in the connected message 120, to identify which previous temporary identifiers it corresponds to. This correlation may be done to avoid a double count of the same RV.

In another example, to aid in the route prediction of the RVs, the navigation route of the RVs may be sent in the connected messages 120 or another form of intent-sharing message to HV. In a further example, the RSU or the HV may use cameras and/or vision sensing to augment the path of the RVs to extrapolate the upcoming positions of the RVs. In yet a further example, explicit trajectory message sharing by the RVs or their forwarding by nearby RSUs to a broader area may be received by the HV. It should be noted that any of various ways may be used to deduce the trajectory of RVs to be visualized to the user on the HMI.

At operation 208, the vehicle 102 creates a map of the vehicles 102 around the HV. In an example, the vehicle 102 identifies the correlated RV locations on roadways defined by a navigation map.

At operation 210, the vehicle 102 uses HV routing to filter the identified vehicles 102. For instance, the vehicle 102 may retrieve a planned trajectory of the HV from the navigation system of the HV. The vehicle 102 may combine that retrieved route trajectory with the information acquired from the RVs as conveyed in their emitted connected messages 120.

The vehicle 102 may use this combination of information to identify which RVs are relevant to the current and future maneuvers to be performed by the HV. In an example, the relevant RVs may be determined based on identifying if the RV is within an interest neighborhood of the HV. The interest neighborhood of a HV may include those vehicles 102 within a predefined longitudinal distance of the HV, and/or within the laterally N or fewer lanes distant from the HV, and/or M or fewer vehicles 102 distant from the HV longitudinally. N and M may be configured empirically and/or based on HV requirement and/or adjusted dynamically based on driver behavior and/or driving skill level. For example, as one possibility N may be two and M may be three. An RV approaching an intersection that the HV is also approaching may be included in the interest neighborhood, if its projected maneuver based on its current location, speed, heading, yaw etc. would render the RV within proximity to the trajectory of the HV in the next T seconds.

Based on the relevance determination, the vehicle 102 may select the RVs to be visualized to the driver of the HV based on relevance criteria. An RV may be selected to be visualized based on preemptive interest criterion. These may include for example, if at least one of the following conditions hold:

The RV is predicted to be on a trajectory coinciding with the HV within the next $T_1$ seconds (e.g., $T_1$=6 seconds).

The RV is accelerating and is predicted to be within less than $L_1$ meters from the HV in $T_2$ seconds (e.g., within $L_1$=2 meters of the HV in the next $T_2$=2.5 seconds).

The RV is speeding, swerving, or changing lane (according to its yaw rate data in its connected messages 120), and is within $L_2$ meters from the vehicle (e.g., $L_2$=200 meters).

The RV is in a blind spot of the HV, the RV is a special vehicle 102, for example, a police car, an ambulance, or a ladder truck, and is within $L_3$ longitudinal distance from the HV.

The RV is a vehicle has its hazard lights on (and the corresponding field in the connected message 120 is on) and is within $L_4$ longitudinal distance of the HV.

The RV is an oversize vehicle (e.g., has number of axles greater than X, is heavy weight, or of height taller than a threshold) and is within $L_5$ longitudinal distance of the HV.

In some examples, the parameters $T_1$-$T_2$, and $L_1$-$L_5$ may be customized or adjusted dynamically based on driver behavior. For example, an elderly or new driver may want to see other vehicles 102 approaching or turning to the RV's lane earlier than an expert driver.

At operation 212, the vehicle 102 overlays the filtered RVs on the display provided by the HMI controller 104-G to show the relevant RVs. The HMI display may also be configured to receive user input via touchscreen or buttons. This allows the HV to combine its display of the planned route with the display of pertinent information acquired from the other vehicles 102 as conveyed in their emitted connected messages 120. In some examples, the locations of RSUs along the HV path may also be visualized on the display to the driver.

In some examples, the tracker application 122 displays relevant RVs relative to their position compared to the HV and uses different appearance schemes to distinguish between HV and RVs (e.g., different colors, different car icons, etc.). In an example, the tracker application 122 also distinguishes special vehicles 102 (e.g., ladder trucks, ambulances, road work vehicles, unstable loads, police cars, etc.) with icons easily recognizable to the human driver.

As shown in an example in FIG. 6 (discussed in more detail below), the HV uses its map navigation route on the HMI to determine that its anticipated maneuver on-ramp will overlap a projected path of an approaching RV based on the connected messages 120 received from the approaching RV. This determination may be accomplished by combining the vehicle 102 onboard navigation with the connected message 120 tracking.

After operation 212, the process 200 ends. It should be noted that the process 200 may be performed continuously, e.g., as in a loop-wise manner. Moreover, it should also be noted that some or all of the operations of the process 200 may be performed in other orderings or concurrent to one another to facilitate the efficient processing and tracking of connected messages 120.

The tracker application 122 may be configured to receive input from the HMI controller 104-G. For instance, the driver may select a visualization of a specific RV (e.g., by a touch of a finger or by moving an arrow button on a controller on the vehicle 102, e.g., one or more buttons on the steering wheel) and may receive and/or view information about the RV, such as its connected message 120 history, its acceleration history in the past $T_3$ seconds, its swerving history in the past $T_4$ seconds, or is type (public vehicle 102 versus private, the number of axles, vehicle 102 weight, vehicle 102 height, the controllability of the vehicle 102), or a driver predictability index obtained based on how well-behaved the vehicle 102 has been driven in the past $L_6$ meters.

In an example, the driver of the HV may provide input by clicking on the visualization of an RV to initiate tracking the RV, to ensure that the RV visualization remains the same even after the temporary identifier of the connected messages 120 changes. In such an example, the correlation at operation 206 may not be performed by default. Additionally, even if the selected RV moves away from the driver's sight, the RV will continue to be tracked as long as its connected messages 120 are received.

In a further example, the navigation route of the HV to its destination may be overlaid on the visualization which shows relevant RVs. An estimated time to overtake or intersect may also be given based on extrapolating one or more of the current instantaneous and/or average speeds (e.g., average taken over the past X seconds, using direct averaging or using a moving average with configurable weight parameters), instantaneous and/or average headings (average taken over the past X seconds, using direct averaging or using a moving average with configurable weight parameters), and yaw (instantaneous and/or average wherein the average is taken over the past X seconds, using direct averaging or using a moving average with configurable weight parameters) of the involved vehicles 102.

In another example, the visualization of an RV that is about to take an action such as turning, changing lane, or accelerating is overlaid with an icon that conveys the RVs intended action. In an example, the visualization of an RV that the HV is in the blind spot of is overlaid with an icon conveying this information. In a related example, the visualization of an RV which is in a blind spot of the HV is overlaid with an icon conveying this information. In an example, the visualization of an RV that has stopped in the road, or a very slowly moving vehicle, is overlaid with an icon that conveys the RV's status to the driver.

Figure 3A:
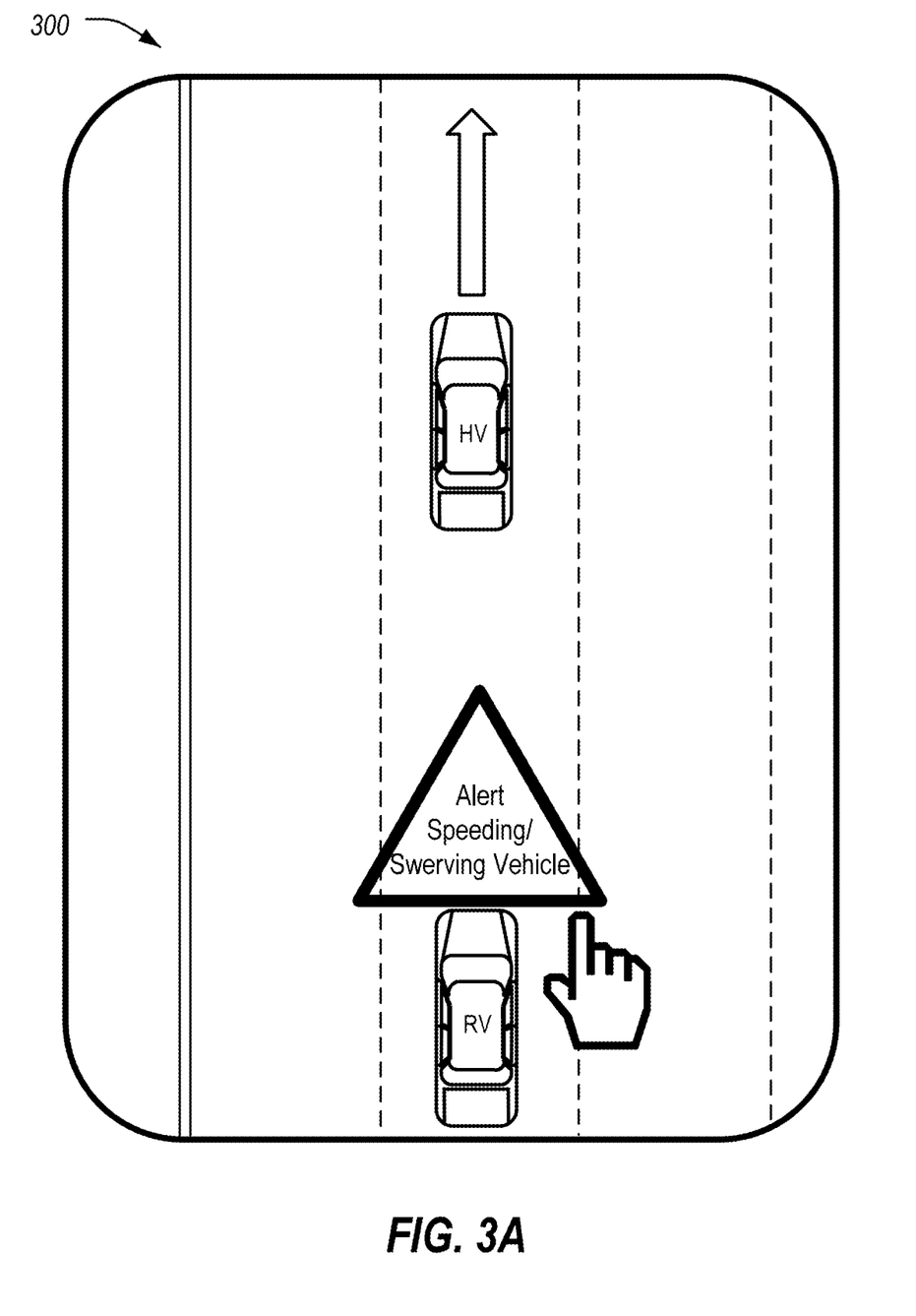
FIG. 3A illustrates an example selection from an HMI screen of a remote vehicle (RV) approaching the host vehicle (HV)
Figure 3B:
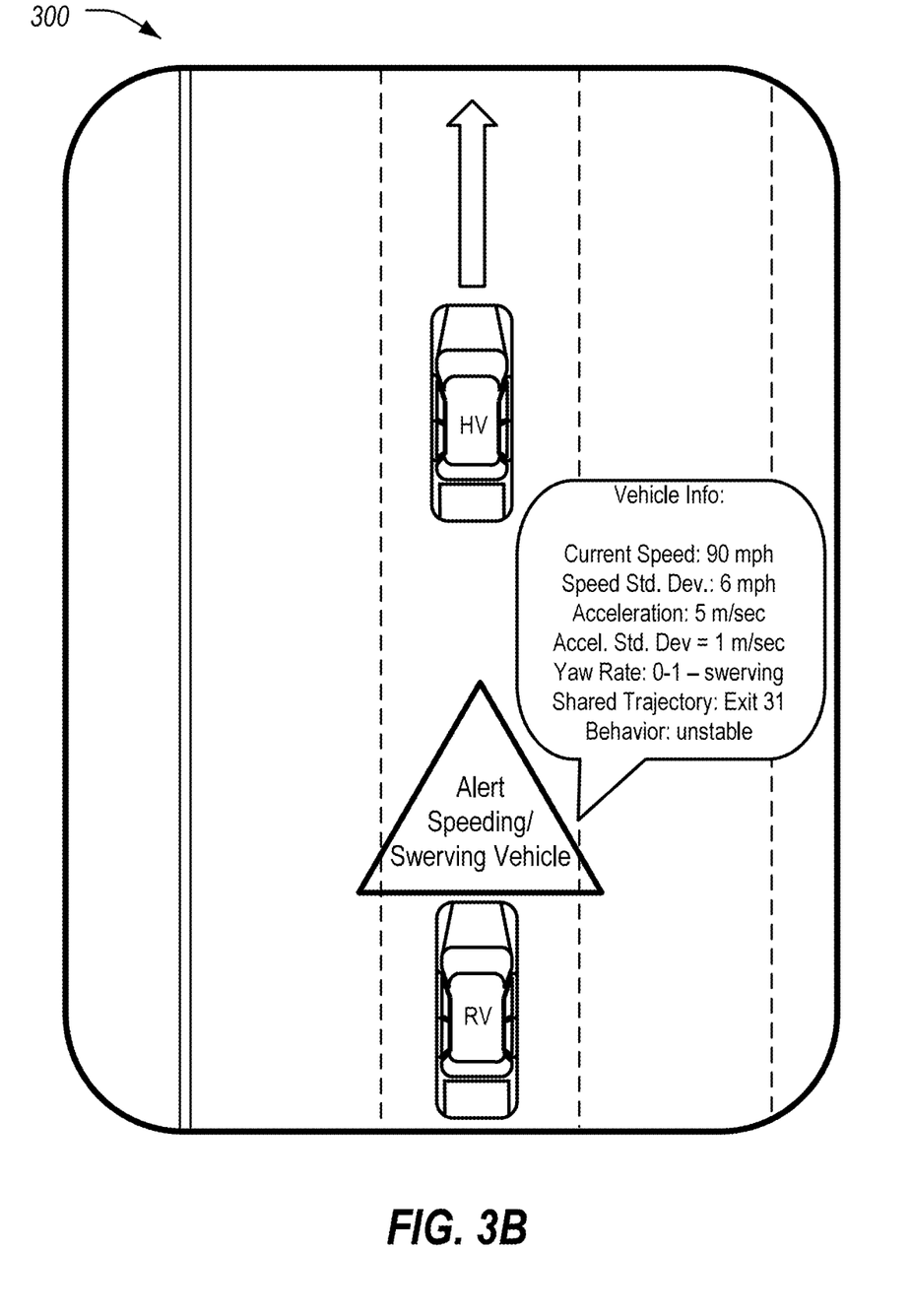
FIG. 3B illustrates an example popup of information about the RV selected in FIG. 3A.

FIGS. 3A and 3B collectively illustrate an example HMI screen 300 that shows a speeding and swerving RV that is approaching the HV. In FIG. 3A, the HMI screen 300 is shown receiving user input, such as a user press of the icon for the speeding RV or the warning overlaid on it. Responsive to receipt of the user input, as shown in FIG. 3B the information for the RV, including speed, recent yaw, and acceleration data, may be displayed in a popup. The speed, yaw, and acceleration displayed may be the latest value, or a moving average based on connected messages 120 received in the last X seconds (e.g., X=5), and/or both their latest or average value together with a measure of their variation over consecutive connected messages 120, such as standard deviation.

Figure 4A:
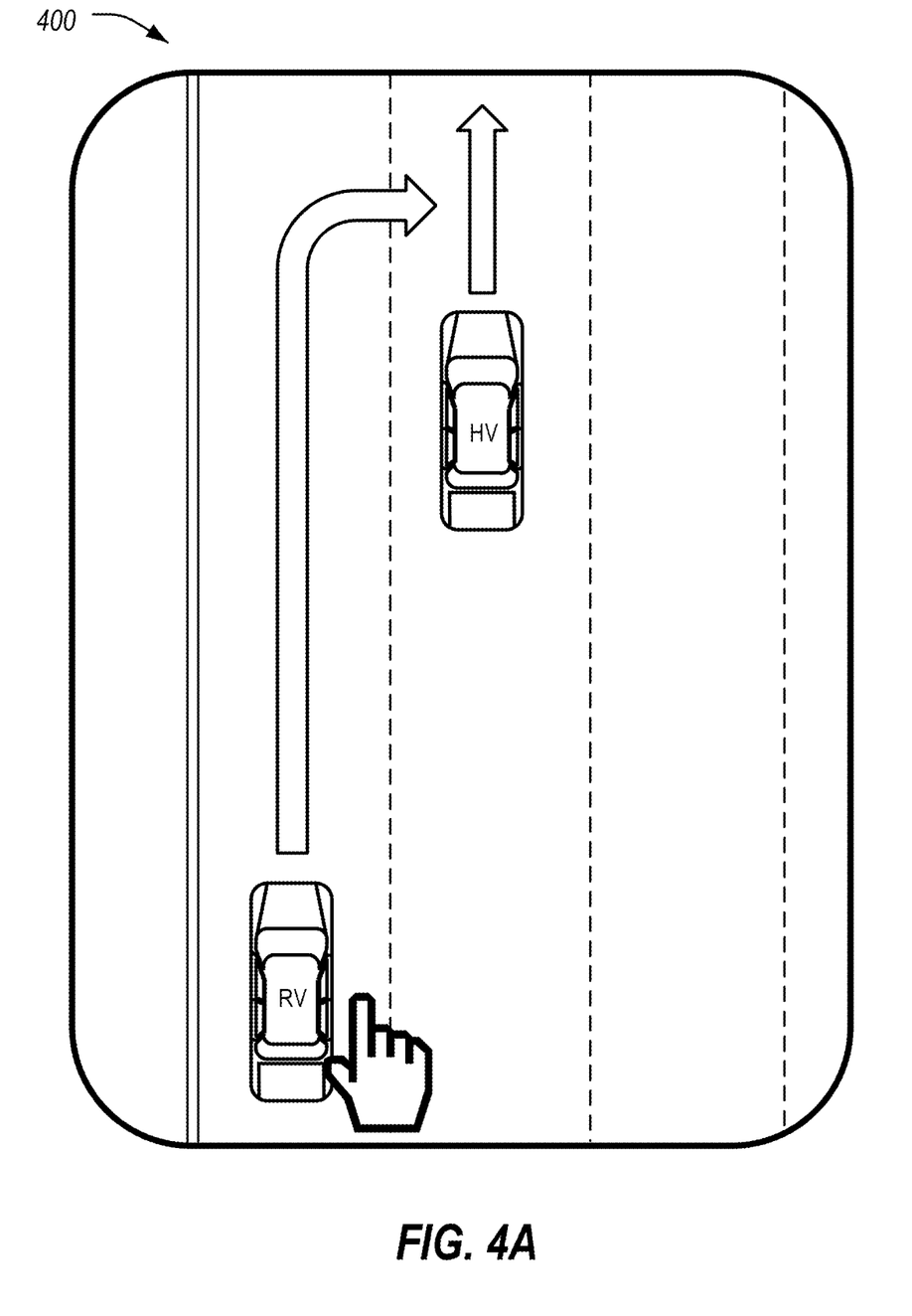
FIG. 4A illustrates an example selection from an HMI screen of an RV that has communicated its predicted trajectory to the HV.
Figure 4B:
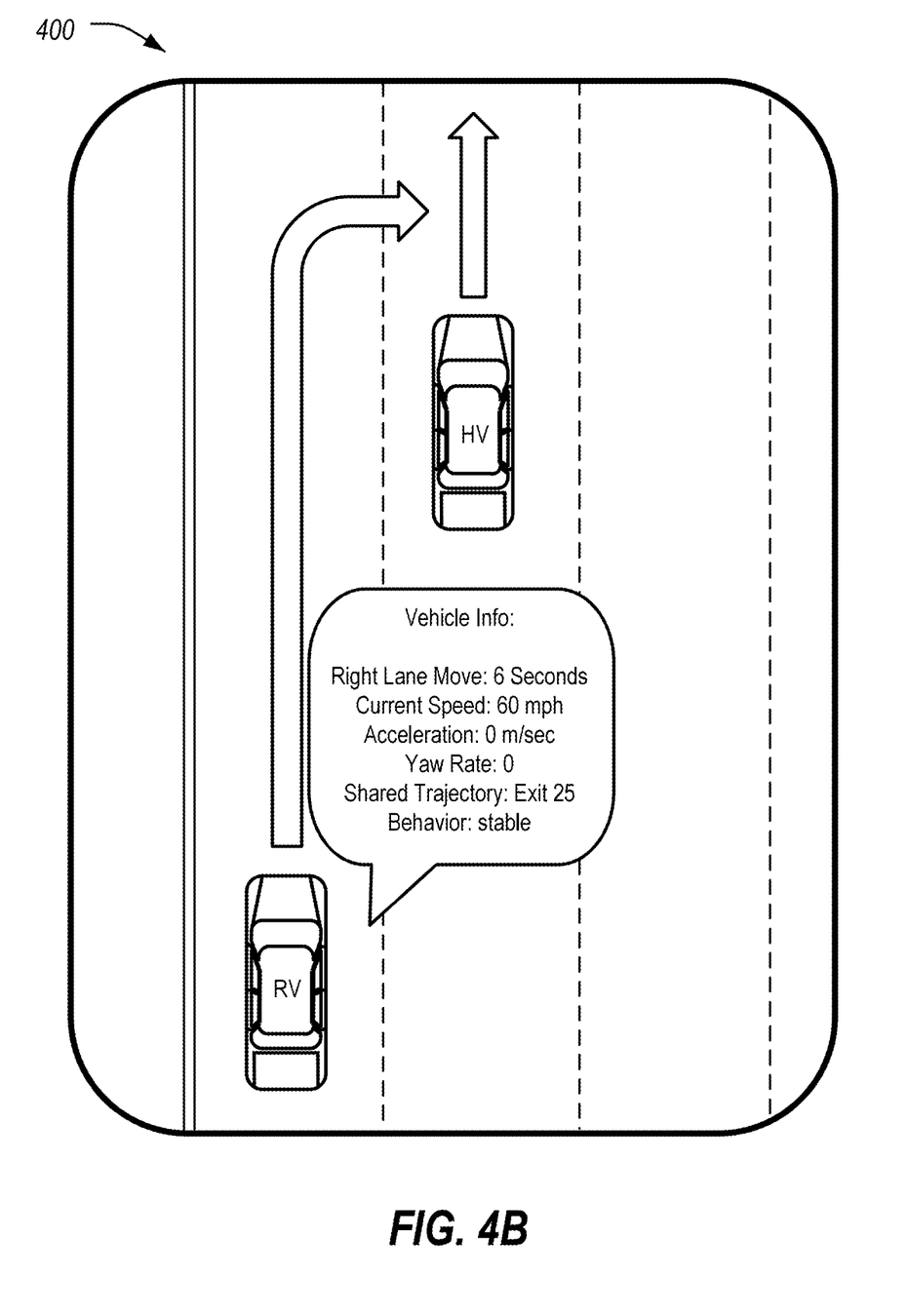
FIG. 4B illustrates an example popup of information about the RV selected in FIG. 4A.

FIGS. 4A and 4B collectively illustrate an example HMI screen 400 that shows an RV that has communicated its predicted trajectory to the HV. As shown in FIG. 4A, the HMI screen 400 indicates to the HV driver that this RV will be coming within the interest neighborhood of the HV unless an action is taken. Upon pressing the icon for the speeding RV, its speed and acceleration information are displayed as shown in FIG. 4B. Similarly, if the icon for the RV is selected on the HMI screen 400, the relevant information for the RV is displayed.

Figure 5A:
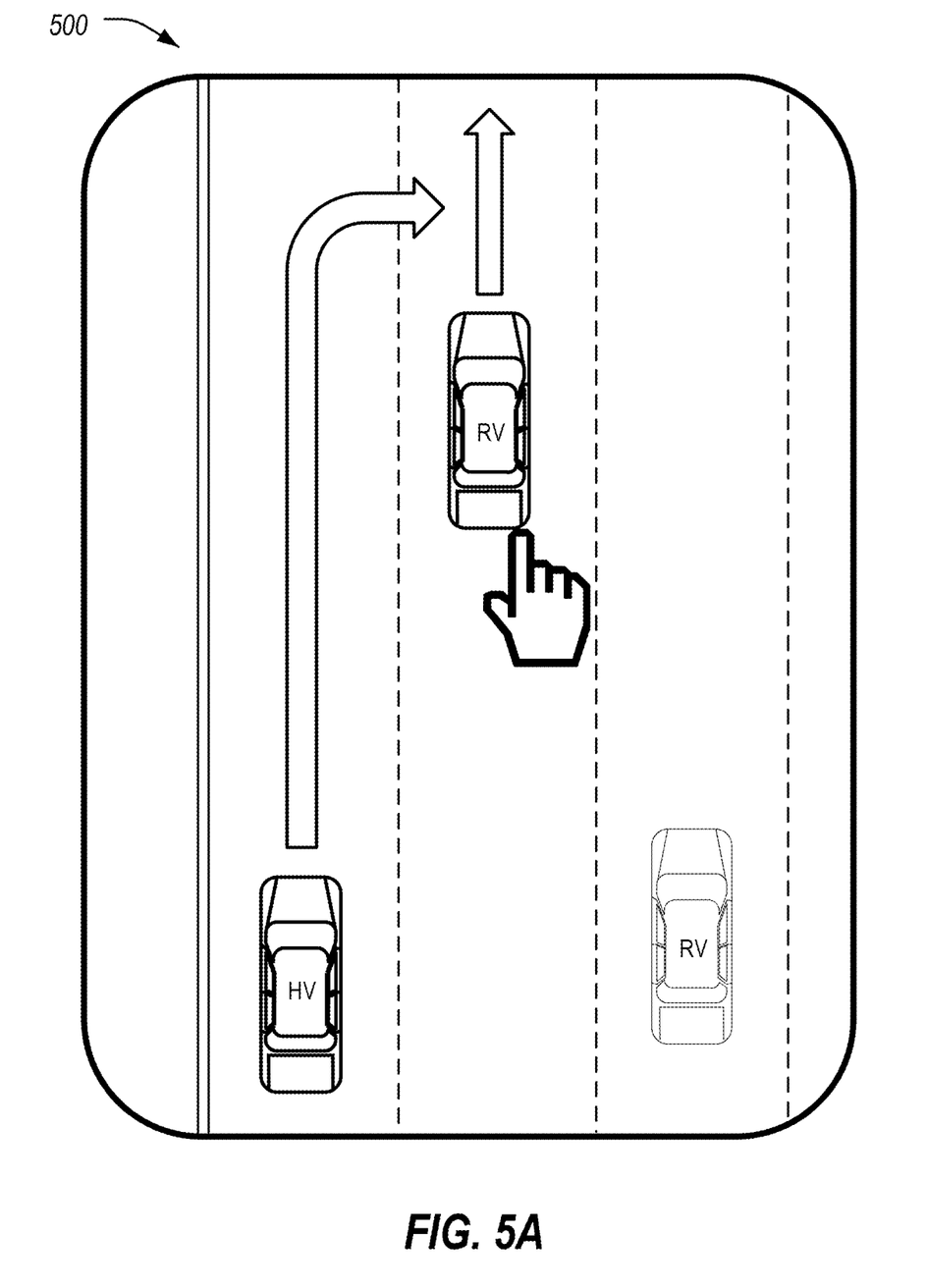
FIG. 5A illustrates an example selection from an HMI screen of an RV having an overlapped predicted path with the HV.
Figure 5B:
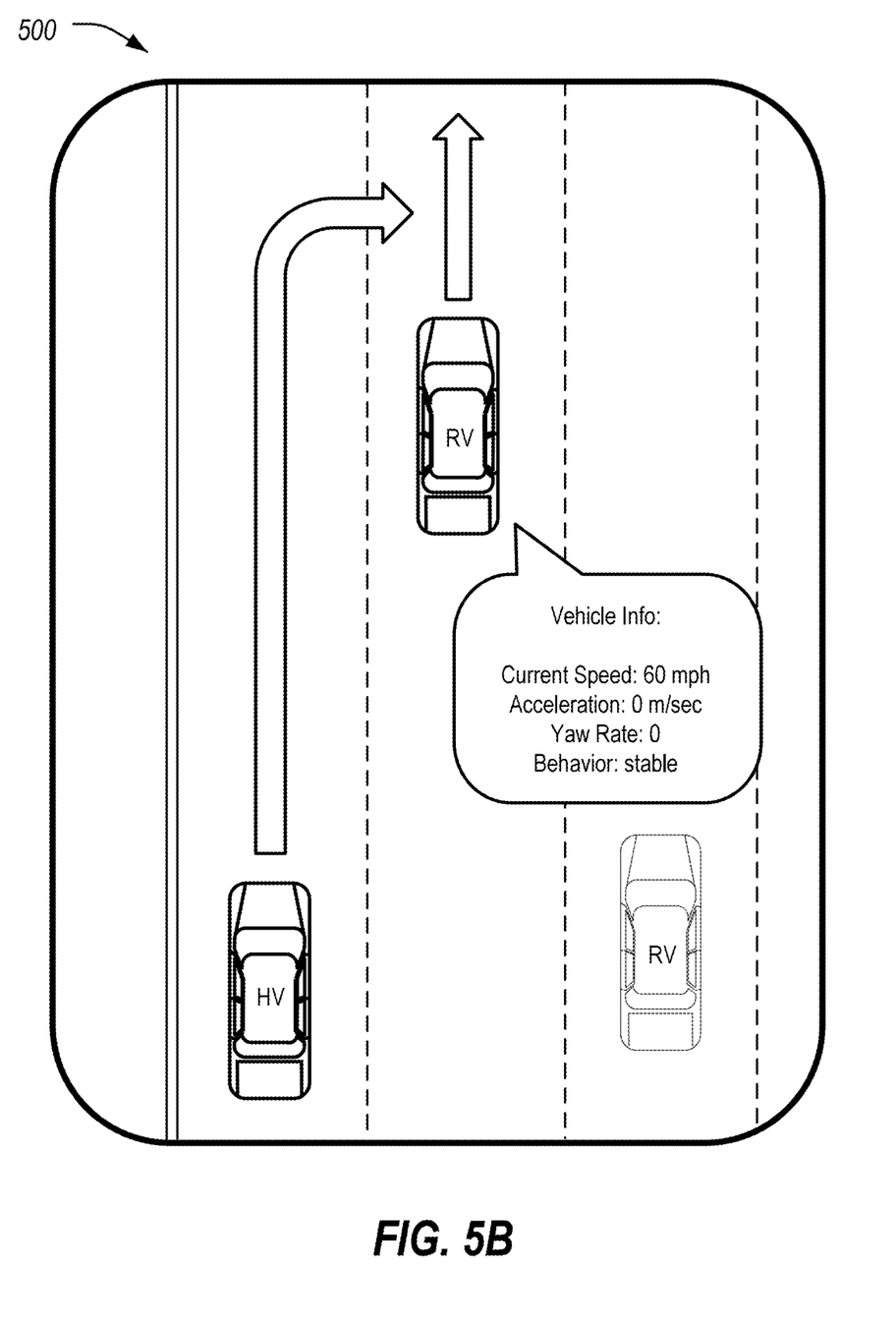
FIG. 5B illustrates an example popup of information about the RV selected in FIG. 5A.

FIGS. 5A and 5B collectively illustrate an example HMI screen 500 that shows the HV and an RV with overlapping predicted paths. The predicted trajectory of the HV may be extracted from the HV navigation system, which indicates that there will be a potential overlap in paths between the HV and the RV if no behavior modification is taken by either the HV or the RV. Responsive to receipt of a press of the icon for the RV as shown in FIG. 5A, the RV speed, acceleration, and other relevant information are displayed in a popup as shown in FIG. 5B.

Figure 6:
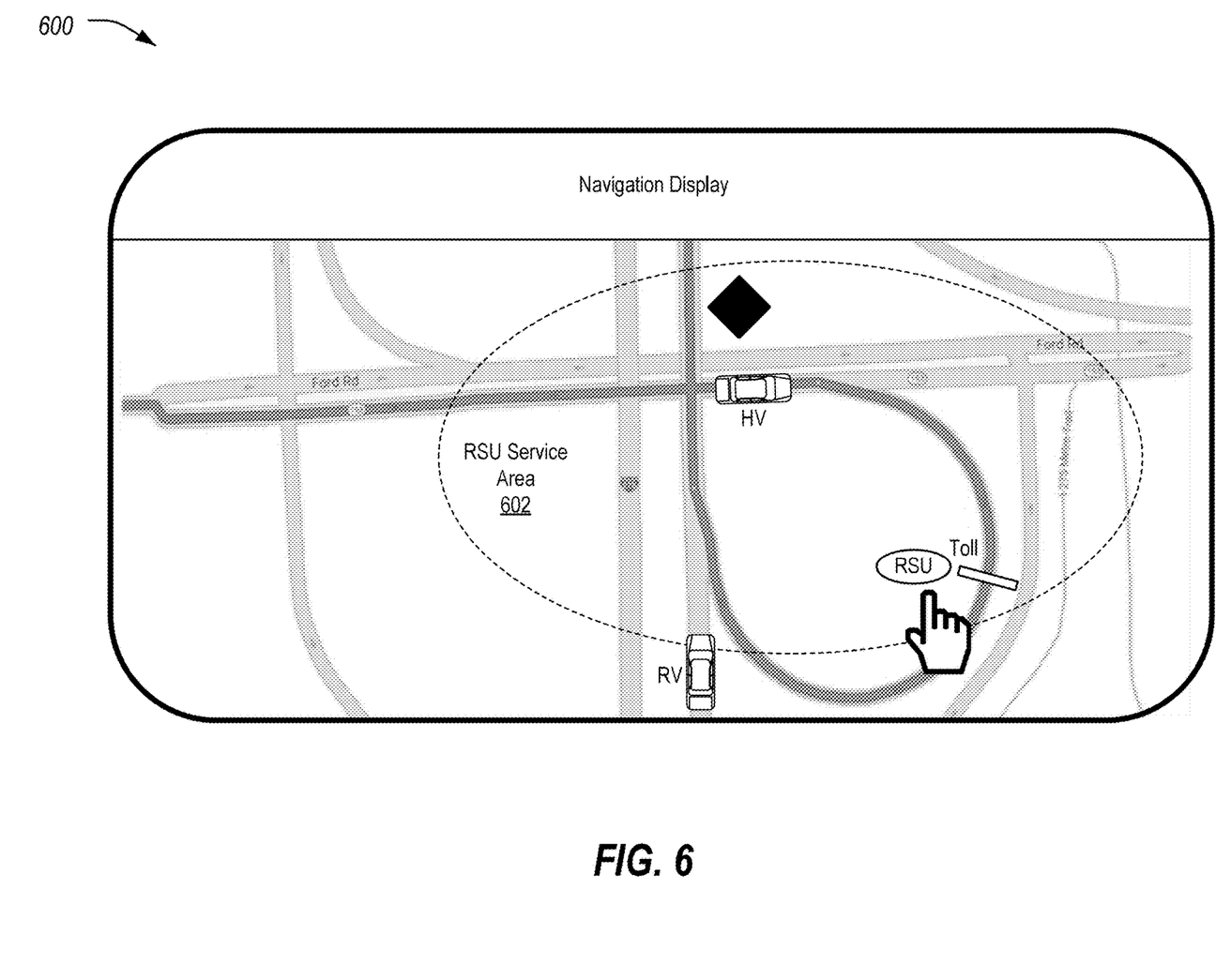
FIG. 6 illustrates an example HMI screen that shows the HV uses its navigation route on HMI to determine that its anticipated maneuver on-ramp will overlap the projected path of an approaching RV based on the connected messages of the RV.

FIG. 6 illustrates an example HMI screen 600 that shows the HV uses its navigation route on HMI to determine that its anticipated maneuver on-ramp may overlap the projected path of an approaching RV based on the connected messages 120 of the RV.

Also shown in FIG. 6, the RSU may be a source of connected messages 120 that may provide for the display of elements on the HMI screen 500. As shown, the RSU supports V2I communication including geographic information with respect to a service area 602 within which the RSU is configured to provide information. This information may also be overlapped onto the navigation map. As shown, the connected messages 120 from the RSU may indicate to the HV that there is a toll booth on the circular ramp within the service area 602. This toll zone may be displayed on the navigation map and, similar to the examples indicated above, the user can tap this item to see the details contained in the V2I message broadcast by the RSU. As another example, the RSU may also broadcast connected messages 120 if there is some road safety message broadcast/traveler information message about road repair work within service area 602, which also may be extracted by the HV and displayed on the navigation map.

Thus, by use of both the onboard navigation of the vehicle 102 and connected message 120 tracking and filtering, an improved HMI may be presented to users of the vehicle 102.

Computing devices described herein, such as the controllers 104, TCU 110, and cloud server 118 generally include computer-executable instructions where the instructions may be executable by one or more computing devices such as those listed above. Computer-executable instructions, such as those of the tracker application 122, may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A host vehicle for vehicle-to-everything (V2X) message-based vehicle tracking, comprising:
    a human-machine interface (HMI) screen; and
    one more controllers of the host vehicle, the one or more controllers including a processor configured to execute computer-executable instructions and a storage configured to maintain the computer-executable instructions, the one or more controllers being programmed to
collect connected messages received from remote vehicles, the connected messages including position, dimension, and/or heading of the remote vehicles,
for each remote vehicle of the remote vehicles, determine a projected path of the each remote vehicle based on the connected messages,
use a route of the host vehicle to a destination, retrieved from a navigation system of the host vehicle, to automatically filter the remote vehicles to define a set of relevant remote vehicles, the set of relevant remote vehicles being those whose projected paths are within an interest neighborhood of the host vehicle as the host vehicle traverses the route to the destination, and
display, to the HMI screen viewable by a driver, a navigation map including the route of the host vehicle and an overlay of the set of relevant remote vehicles, without displaying the remote vehicles that are not within the interest neighborhood, to enhance the navigation map to only show positions of the set of relevant remote vehicles.

2. The host vehicle of claim 1, where the one or more controllers are further programmed to:
assign each remote vehicle to a unique identifier;
predict future locations of each remote vehicle based on information in the connected messages; and
assign successive messages from each remote vehicle to the same respective unique identifier based on the predicted future locations.

3. The host vehicle of claim 1, wherein the one or more controllers are further programmed to collect additional connected messages received from roadside units, the additional connected messages including position, dimension, and/or heading of toll gantries or construction zones.

4. The host vehicle of claim 1, wherein the interest neighborhood of the host vehicle includes the remote vehicles that are within a predefined longitudinal distance of the host vehicle.

5. The host vehicle of claim 1, wherein the interest neighborhood of the host vehicle includes the remote vehicles that are within a predefined threshold distance of N of lanes from the host vehicle.

6. The host vehicle of claim 1, wherein the interest neighborhood of the host vehicle includes the remote vehicles that are within a predefined threshold distance M of vehicles from the host vehicle longitudinally.

7. The host vehicle of claim 1, wherein the interest neighborhood of the host vehicle includes an intersection that the host vehicle is approaching in the next T seconds.

8. The host vehicle of claim 1, wherein the route of the host vehicle is a navigation route received from a navigation system of the host vehicle.

9. The host vehicle of claim 1, wherein the HMI screen is a touch screen and the one or more controllers are further programmed to, responsive to receipt of user selection of one of the remote vehicles from the HMI screen, display a popup including information with respect to the one of the remote vehicles.

10. The host vehicle of claim 1, wherein the overlay further indicates an estimated time to overlap of the projected path with the route.

11. The host vehicle of claim 1, wherein the overlay for one or more of the relevant remote vehicles includes an icon indicating a projected action to be taken by the one or more of the relevant remote vehicles, the action including one or more of turning, changing lanes, accelerating, slowing, or stopping.

12. The host vehicle of claim 1, wherein the overlay indicates which, if any, of the relevant remote vehicles are within a blind spot of the host vehicle.

13. The host vehicle of claim 1, wherein the overlay indicates whether the host vehicle is within a blind spot of any of the relevant remote vehicles.

14. The host vehicle of claim 1, wherein the one or more controllers are further configured to:
receive input to the HMI screen to track one of the relevant remote vehicles; and
ensure the tracked one of the relevant remote vehicles remains visible on the HMI screen while the connected messages from the one of the remote vehicles are received.

15. A method for vehicle-to-everything (V2X) message-based vehicle tracking, comprising:
collecting, by a host vehicle, connected messages received from remote vehicles, the connected messages including position, dimension, and heading of the remote vehicles;
for each remote vehicle of the remote vehicles, determining a projected path of the each remote vehicle based on the connected messages;
using a route of the host vehicle to a destination, retrieved from a navigation system of the host vehicle, to automatically filter the remote vehicles to define a set of relevant remote vehicles, the set of relevant remote vehicles being those whose projected paths are within an interest neighborhood of the host vehicle as the host vehicle traverses the route to the destination; and
displaying, to an HMI screen of the host vehicle viewable by a driver, a navigation map including the route of the host vehicle and an overlay of the set of relevant remote vehicles, without displaying the remote vehicles that are not within the interest neighborhood, to enhance the navigation map to only show positions of the set of relevant remote vehicles.

16. The method of claim 15, wherein the interest neighborhood of the host vehicle includes the remote vehicles that are within a predefined longitudinal distance of current and future maneuvers as indicated by the route to be performed by the host vehicle.

17. The method of claim 15, wherein the interest neighborhood of the host vehicle includes the remote vehicles that are within a predefined threshold distance N of lanes from current and future maneuvers as indicated by the route to be performed by the host vehicle.

18. The method of claim 15, wherein the interest neighborhood of the host vehicle includes the remote vehicles that are within a predefined threshold distance M of vehicles from current and future maneuvers as indicated by the route to be performed by the host vehicle longitudinally.

19. The method of claim 15, wherein the interest neighborhood of the host vehicle includes an intersection that the host vehicle is approaching in the next T seconds.

20. The method of claim 15, wherein the route of the host vehicle is a navigation route received from the navigation system of the host vehicle.

21. The method of claim 15, wherein the HMI screen is a touch screen and further comprising, responsive to receipt of user selection of one of the remote vehicles from the HMI screen, displaying a popup including the one of the remote vehicles.

22. The method of claim 15, further comprising:
assigning each remote vehicle to a unique identifier;
predicting future locations of each remote vehicle based on information in the connected messages; and
assigning successive messages from each remote vehicle to the same respective unique identifier based on the predicted future locations.

23. A non-transitory computer-readable medium comprising instructions for vehicle-to-everything (V2X) message-based vehicle tracking, that when executed by one or more controllers of a host vehicle, the one or more controllers including a processor configured to execute computer-executable instructions and a storage configured to maintain the computer-executable instructions, cause the host vehicle to perform operations including to:
collect connected messages received from remote vehicles, the connected messages including position, dimension, and heading of the remote vehicles;
for each remote vehicle of the remote vehicles, determine a projected path of the each remote vehicle based on the connected messages;
assign each remote vehicle to a unique identifier;
predict future locations of each remote vehicle based on information in the connected messages;
assign successive messages from each remote vehicle to the same respective unique identifier based on the predicted future locations;
use a navigation route to a destination received from a navigation system of the host vehicle to automatically filter the remote vehicles to define a set of relevant remote vehicles, the set of relevant remote vehicles being those within proximity to current and future maneuvers as indicated by the route to be performed by the host vehicle traversing the route based on identifying if the remote vehicles are within an interest neighborhood of the host vehicle; and
display, to an HMI screen of the host vehicle viewable by a driver, a navigation map including the route of the host vehicle and an overlay of the set of relevant remote vehicles, without displaying the remote vehicles that are not within the interest neighborhood, to enhance the navigation map to only show positions of the set of relevant remote vehicles.

24. The medium of claim 23, wherein the interest neighborhood of the host vehicle includes one or more of:
the remote vehicles that are within a predefined longitudinal distance of the current and future maneuvers to be performed by the host vehicle;
the remote vehicles that are within a predefined threshold distance of N of lanes from the current and future maneuvers to be performed by the host vehicle;
the remote vehicles that are within a predefined threshold longitudinal distance M of vehicles from the current and future maneuvers to be performed by the host vehicle; or
an intersection that the host vehicle is approaching in the next T seconds.

25. The medium of claim 23, wherein the HMI screen is a touch screen and the computer-readable medium further includes instructions that, when executed by the one or more controllers, cause the one or more controllers to, responsive to receipt of user selection of one of the remote vehicles from the HMI screen, displaying a popup including the one of the remote vehicles.

* * * * *